US009817665B2

(12) United States Patent
Zavalney

(10) Patent No.: US 9,817,665 B2
(45) Date of Patent: Nov. 14, 2017

(54) SYSTEM AND TECHNIQUE FOR RETRIEVING AN INSTRUCTION FROM MEMORY BASED ON A DETERMINATION OF WHETHER A PROCESSOR WILL EXECUTE THE INSTRUCTION

(75) Inventor: Paul I. Zavalney, Austin, TX (US)

(73) Assignee: SILICON LABORATORIES INC., Austin, TX (US)

(*) Notice: Subject to any disclaimer, the term of this patent is extended or adjusted under 35 U.S.C. 154(b) by 1810 days.

(21) Appl. No.: 13/077,424

(22) Filed: Mar. 31, 2011

(65) Prior Publication Data

US 2012/0254590 A1  Oct. 4, 2012

(51) Int. Cl.
*G06F 9/30* (2006.01)
*G06F 9/38* (2006.01)

(52) U.S. Cl.
CPC ........ *G06F 9/3804* (2013.01); *G06F 9/30054* (2013.01); *G06F 9/30076* (2013.01)

(58) Field of Classification Search
CPC . G06F 9/30076; G06F 9/30054; G06F 9/3804
USPC .................................................. 712/205, 233
See application file for complete search history.

(56) References Cited

U.S. PATENT DOCUMENTS 4,773,002 A * 9/1988 Iwasaki et al. ............... 712/226
6,092,186 A * 7/2000 Betker et al. ................. 712/233
2005/0223172 A1* 10/2005 Bortfeld ........................ 711/125
2007/0204140 A1* 8/2007 Shade ........................... 712/220
2007/0223579 A1* 9/2007 Bao .......................... 375/240.12
2008/0140995 A1* 6/2008 Fukazawa ..................... 712/205

OTHER PUBLICATIONS

CPU cache, Dec. 30, 2009, Wikipedia, pp. 1-20.*
Shen and Lipasti, Modern Processor Design—Fundamentals of Superscalar processors, 2005, McGraw Hill, 1st edition, pp. 217-279.*
NOP, Sep. 29, 2009, Wikipedia, pp. 1-4.*
External Memory, Feb. 17, 1997, Foldoc, 1 page.*
8051 Instruction Set Manual, May 15, 2006, Keil, 2 pages, [retrieved from the internet on Jun. 8, 2015], retrieved from URL<http://www.keil.com/support/man/docs/is51/is51_nop.htm>.*
Tyson et al, How PCI Works, Feb. 9, 2005, How Stuff Works, 3 pages, [retrieved from the internet on Jun. 7, 2015], retrieved from URL <http://computer.howstuffworks.com/pci1.htm>.*
Tyson et al, How PCI works, Mar. 1, 2005, How Stuff works, 3 pages, [retreived from the internet on Sep. 2, 2016], retreived from URL <www.howstuffworks.com/pci1.htm>.*

* cited by examiner

*Primary Examiner* — Jyoti Mehta
(74) *Attorney, Agent, or Firm* — Trop, Pruner & Hu, P.C.

(57) ABSTRACT

A technique includes receiving a request from a processor to retrieve a first instruction from a memory for a staged execution pipeline. The technique includes selectively retrieving the first instruction from the memory in response to the request based on a determination of whether the processor will execute the first instruction.

8 Claims, 5 Drawing Sheets

SYSTEM AND TECHNIQUE FOR RETRIEVING AN INSTRUCTION FROM MEMORY BASED ON A DETERMINATION OF WHETHER A PROCESSOR WILL EXECUTE THE INSTRUCTION

BACKGROUND

This disclosure generally relates to a system and technique for a processor having a staged execution pipeline.

For purposes of reducing latency in its processing, a processor may employ pipelining. The pipelining increases processor efficiency by causing the processor to process multiple instructions at the same time. In this manner, the processor typically processes a given instruction in multiple stages that extend over several processing cycles. With pipelining, the processor processes different stages of multiple instructions at the same time, which allows the processor to execute more instructions in a relatively shorter period of time, as compared to the processor completely processing each instruction before beginning the processing of the next instruction. As an example of pipelining, the processor may fetch a first instruction, while concurrently executing a second instruction and performing a memory access related to a third instruction.

SUMMARY

In an exemplary embodiment, a technique includes receiving a request from a processor to retrieve a first instruction from a memory for a staged execution pipeline. The technique includes selectively retrieving the first instruction from the memory in response to the request based on a determination of whether the processor will execute the first instruction.

In another exemplary embodiment, an apparatus includes a processor and a controller. The processor is adapted to provide a request to retrieve a first instruction from a memory for a staged execution pipeline, and the controller is adapted to selectively retrieve the first instruction from the memory in response to the request based on a determination of whether the processor will execute the first instruction.

In yet another exemplary embodiment, an apparatus includes an integrated circuit that includes a processor, a memory and a controller. The processor is adapted to provide a request to retrieve a first instruction from a memory for a staged execution pipeline, and the controller is adapted to selectively retrieve the first instruction from the memory in response to the request based on a determination of whether the processor will execute the first instruction.

Advantages and other features of the disclosed concepts will become apparent from the following drawing, description and claims.

DETAILED DESCRIPTION

Figure 1:
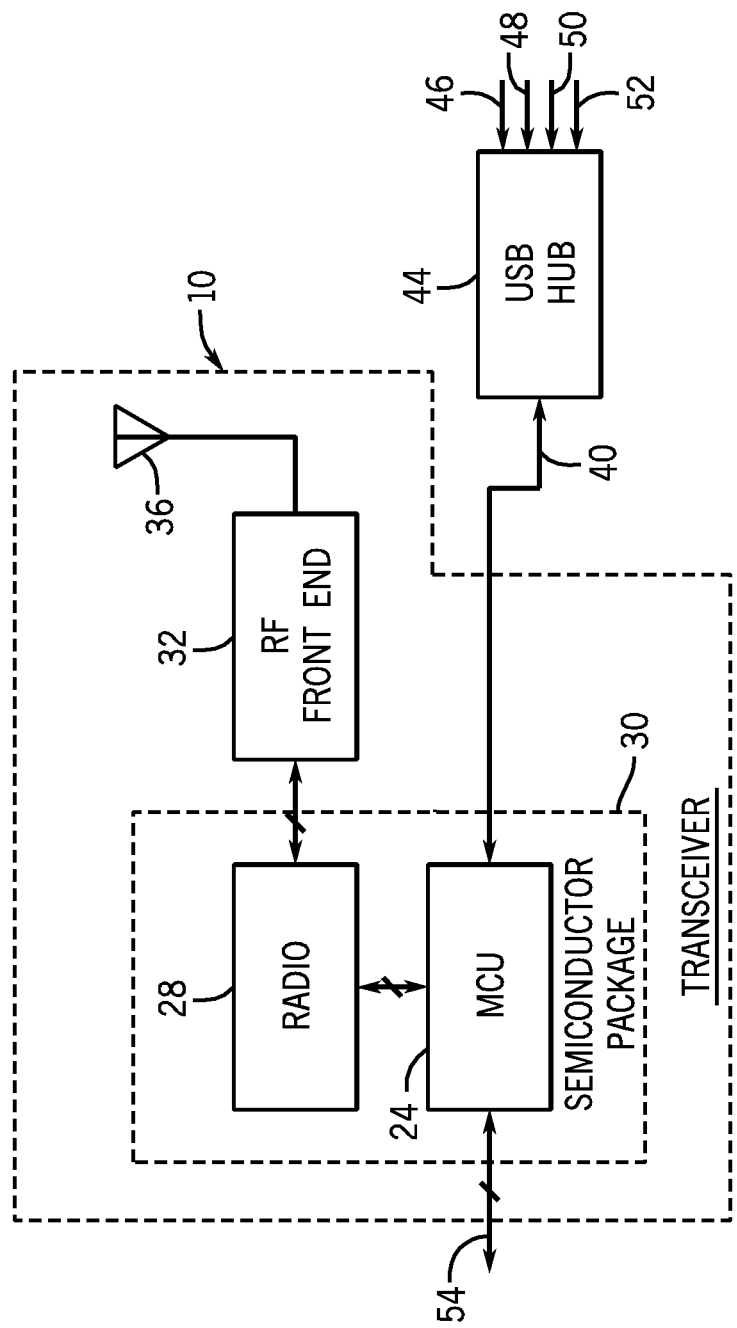
FIG. 1 is a schematic diagram of a transceiver system according to an exemplary embodiment.

Referring to FIG. 1, in accordance with exemplary embodiments, a microcontroller unit (MCU) 24 may be used in a variety of applications, such as applications in which the MCU 24 controls various aspects of a transceiver 10 (as a non-limiting example). In this regard, the MCU 24, for a particular example, may be part of an integrated circuit (IC), or semiconductor package 30, which also includes a radio 28. As a non-limiting example, the MCU 24 and the radio 28 may collectively form a packet radio, which processes incoming and outgoing streams of packet data. To this end, the transceiver 10 may further include a radio frequency (RF) front end 32 and an antenna 36, which receives and transmits RF signals (frequency modulated (FM) signals, for example) that are modulated with the packet data.

As non-limiting examples, the transceiver 10 may be used in a variety of applications that involve communicating packet stream data over relatively low power RF links and as such, may be used in wireless point of sale devices, imaging devices, computer peripherals, cellular telephone devices, etc. As a specific non-limiting example, the transceiver 10 may be employed in a smart power meter which, through a low power RF link, communicates data indicative of power consumed by a particular load (a residential load, for example) to a network that is connected to a utility. In this manner, the transceiver 10 may transmit packet data indicative of power consumed by the load to mobile meter readers as well as to an RF-to-cellular bridge, for example. Besides transmitting data, the transceiver 10 may also receive data from the utility or meter reader for such purposes (as non-limiting examples) as inquiring as to the status of various power consuming devices or equipment; controlling functions of the smart power meter; communicating a message to a person associated with the monitored load, etc.

As depicted in FIG. 1, in addition to communicating with the radio 28, the MCU 24 may further communicate with other devices and in this regard may, as examples, communicate over communication lines 54 with a current monitoring and/or voltage monitoring device of the smart power meter as well as communicate with devices over a Universal Serial Bus (USB) 40. For example, various USB links 46, 48, 50 and 52 may communicate via a hub 44 and the USB 40 with the transceiver 10 for such purposes as communicating with a residential computer regarding power usage of various appliances, communicating with these appliances to determine their power usages, communicating with the appliances to regulate their power usages, etc.

Figure 2:
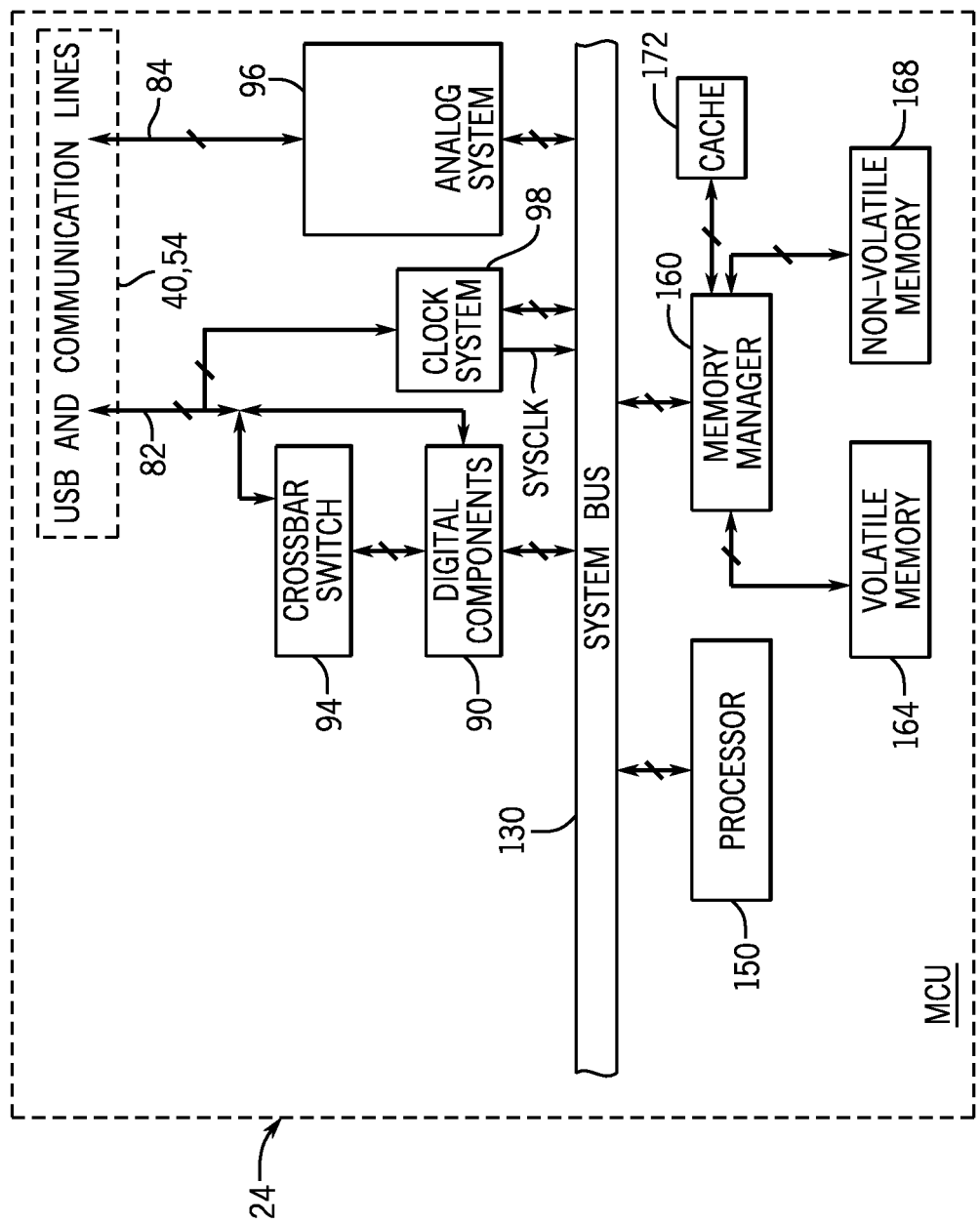
FIG. 2 is a schematic diagram of a microcontroller unit of FIG. 1 according to an exemplary embodiment.

Referring to FIG. 2, the MCU 24 includes a processor 150. As a non-limiting example, the processor 150 may be a 32-bit processing core, such as the Advanced RISC Machine (ARM) processor core, which executes a Reduced Instruction Set Computer (RISC) instruction set. As persons of ordinary kill in the art recognize, however, the processor 150 may have other bus widths, instruction sizes, architectures, and the like. In general, the processor 150 communicates with various other system components of the MCU 24, such as a memory controller, or manager 160, over a system bus 130. In general, the memory manager 160 controls access to the various memory components of the MCU 24, such as a cache 172, a non-volatile memory 168 (a flash memory, for example) and a volatile memory 164 (a static random access memory (SRAM), for example).

The MCU 24 also includes various digital peripheral components 90, such as (as non-limiting examples) a USB interface, a programmable counter/timer array (PCA), a universal asynchronous receiver/transmitter (UART), a system management bus (SMB) interface, a serial peripheral interface (SPI), etc. The MCU unit 24 may include a crossbar switch 94, which permits the programmable assigning of the digital peripheral components 90 to digital output terminals 82 of the MCU 24. In this regard, the MCU 24 may be selectively configured to selectively assign certain output terminals 82 to the digital peripheral components 90.

Among its other features, the MCU 24 may include a clock system 98 and an analog system 96. The clock system 98 provides one or more system clock signals (one of which is called "SYSCLK" in FIG. 2) to the system bus 130, which is used to clock operations, for example, of the processor 150. The analog system 96 includes various interfaces to analog terminals 84 of the MCU 24. For example, the analog system 96 may include various components that receive analog signals, such as analog-to-digital converters (ADCs), comparators, etc.; and the analog system 96 may include current drivers that are coupled to the analog terminals 84. As examples of its other components, the analog system 96 may include one or more low dropout (LDO) converters.

Figure 3:
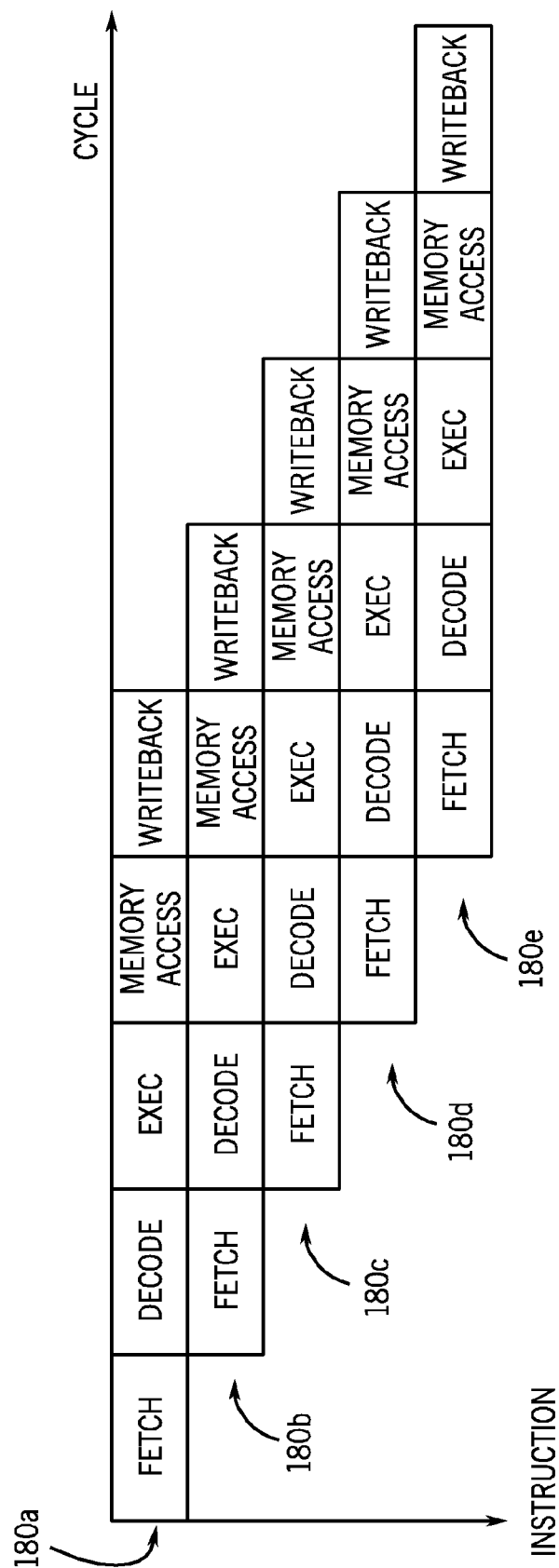
FIG. 3 is an illustration of a staged pipeline architecture according to an exemplary embodiment.

In accordance with exemplary embodiments, the processor 150 employs a staged pipeline execution architecture. Pursuant to this architecture, the processor 150 processes different stages of different instructions at the same time. FIG. 3 depicts the processing of exemplary multiple stage instructions 180a, 180b, 180c, 180d and 180e pursuant to the staged execution pipeline. Each of the instructions 180a, 180b, 180c, 180d and 180e has associated five stages for this example: a fetch stage in which the processors fetches data corresponding to the instruction from memory; instruction is retrieved and provided to the processor 150; a decode stage in which the processor 150 decodes the instruction; an execution stage in which the processor 150 executes the decoded instruction; a memory stage in which the processor 150 accesses memory as a result of the instruction execution; and a writeback stage in which the processor 150 writes the results associated with the instruction's execution to memory.

Referring to FIG. 3 in conjunction with FIG. 2, on clock cycle 1, the processor 150 processes the fetch stage of the first instruction 180a, which causes the processor 150 to submit a memory request for purposes of retrieving data indicative of the first instruction from a memory of the MCU 24. As shown in FIG. 3, during the second clock cycle, the processor 150 processes the fetch stage of the second instruction 180b, while at the same time decoding the fetched first instruction 180a. On clock cycle 3, the processor 150 begins processing a third instruction 180c by fetching data indicative of this instruction from memory. Concurrently with this operation, the processor 150 decodes the second instruction 180b and executes the first instruction 180a. By clock cycle 4 of this example, the processor 150 concurrently is fetching data indicative of the fourth instruction 180d from memory, decoding the third instruction 180c, executing the second instruction 108b and performing a memory access due to the execution of the first instruction 180a. On the clock cycle 5, the processor 150 is fetching data indicative of the fifth instruction 180e, decoding the fourth instruction 180d, executing the third instruction 180c, performing a memory access due to the execution of the second instruction 180b and writing the results of the finished execution of the first instruction 180a to a register of the processor 150.

Due to the staged pipeline execution architecture, it is possible that the processor 150 may begin processing an instruction to be fetched that is ultimately not executed by the processor 150. For example, the processor 150 may execute a branch instruction concurrently with the fetching of another instruction. As a non-limiting example, this branch instruction may be an unconditionable branch instruction that bypasses the execution of certain instructions, and as a result, subsequently-fetched instructions, such as the instruction being fetched in this example, are ignored due to the corresponding unconditional branch.

If not for the techniques of the MCU 24 disclosed herein, the fetching of an unused instruction inefficiently consumes bandwidth on the system bus 130 and may entail access to a relatively slow memory that stores the instruction, such as the non-volatile memory 168. As a result, the fetching of the instruction may hold up the system bus 130 and consequently may hold up the processor 150 from eventually processing an instruction that is never executed.

To address the above-described scenario, the memory manager 160 recognizes when the processor 150 is fetching an instruction that the processor 150 will not execute, and takes corrective action to prevent the fetching of this instruction from tying up system resources. For example, the memory manager 160, in accordance with exemplary embodiments, returns a benign instruction or value to the system bus 130 without fetching the requested instruction from memory when the processor 150 attempts to fetch an instruction that will not be executed, thereby avoiding the relatively large latency associated with returning the actual instruction to the processor 150.

Figure 4:
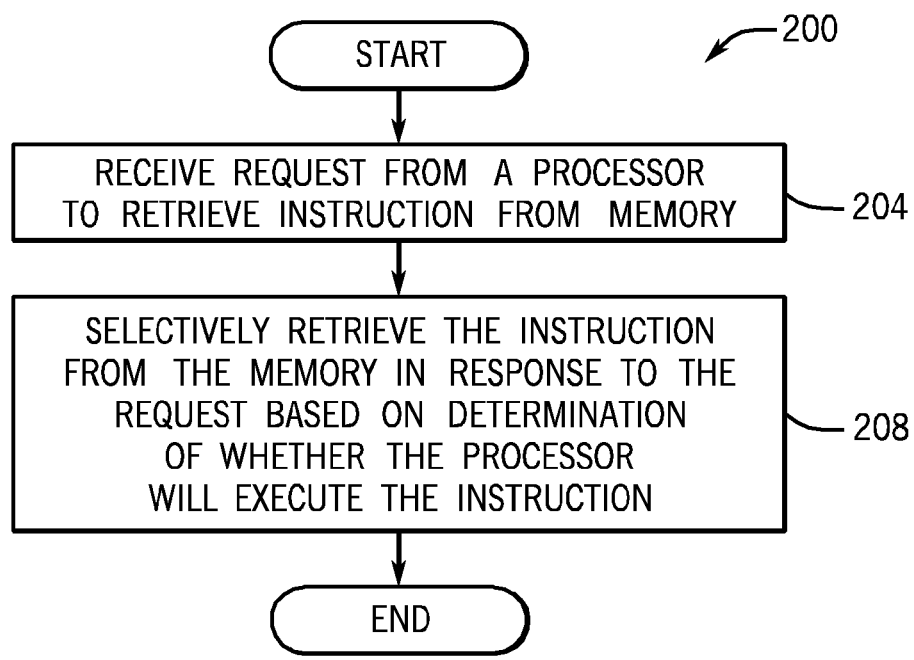
FIGS. 4 and 6 are flow diagrams illustrating techniques for responding to a processor request to retrieve an instruction from memory according to exemplary embodiments.

More specifically, referring to FIG. 4 in conjunction with FIG. 2, in accordance with exemplary embodiments, the memory manager 160 performs a technique 200 to limit the impact of such instruction fetching on system resources. The technique 200 includes receiving (block 204) a request from a processor to retrieve an instruction from memory and selectively retrieving (block 208) the instruction from the memory in response to the request based on a determination of whether the processor will execute the instruction.

As a non-limiting example, in accordance with some exemplary embodiments, the memory manager 160 monitors a branch signal (a multi-bit signal, for example), which is provided by the processor 150 for purposes of identifying when a given requested instruction will not be executed by the processor 150. In general, the branch signal indicates, via its associated bits, whether the processor 150 is currently executing a branch instruction, which causes the processor 150 to bypass subsequently fetched instruction(s) originally scheduled for execution, thereby rendering the instruction(s) "unused." Therefore, depending on the status of the branch signal, the memory manager 160 either fulfills a given instruction request or ignores the request and alternatively furnishes a benign instruction or value to the system bus 130 in response to the request. In other exemplary embodiments, the memory manager 160 determines whether the instruction that is being requested by the processor 150 will not be executed by the processor 150 by analyzing a sequence of recently-fetched instructions by the processor 150. Thus, many variations are contemplated and are within the scope of the appended claims.

In accordance with some exemplary embodiments, the memory manager 160 furnishes a no operation instruction (called an "NOP instruction"), to the system bus 130 when the instruction that is requested by the processor 150 will not be executed. A benign instruction, such as the NOP instruction, permits continued uninterrupted operation of the processor's staged execution pipeline without causing the processor 150 to enter an error state. The particular benign value or instruction that is furnished by the memory manager 160 may be hardcoded in the memory manager 160 or may be established by a firmware or software-written value that is stored in a register, depending on the particular exemplary embodiment.

Figure 5:
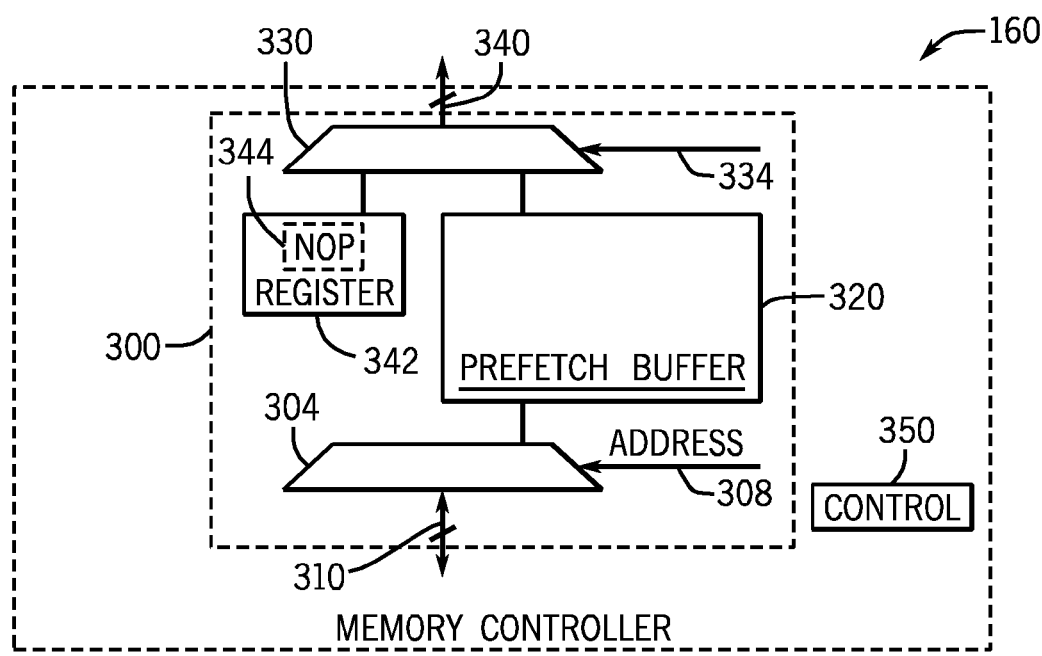
FIG. 5 is a schematic diagram of a memory manager of FIG. 2 according to an exemplary embodiment.

As a more specific example, FIG. 5 depicts a schematic diagram of a read request processing path 300 of the memory manager 160, in accordance with some exemplary embodiments. In general, the read request processing path 300 includes multiplexing circuitry 304 that, depending on an address 308 associated with a read request from the system bus 130, couples (via lines 310) to the appropriate lines of the non-volatile memory 168 to retrieve the requested data. As depicted in FIG. 5, the read path 300 may include at least one prefetch buffer 320, which accumulates requested data to be furnished to the system bus 130. As also depicted in FIG. 5, the read path 300 may further include a multiplexer 330 (coupled to the system bus 130 via output lines 340), which depending on the value of a control signal that is supplied to control terminals 334, selects either the output of the prefetch buffer 320 or the output terminals of a register 342.

For this example, the register 342 stores a NOP instruction 344, which is the benign instruction provided by the memory manager 160 to the system bus 130 when the manager 160 determines that the processor 150 is requesting an instruction that will not be executed. The control signal provided to the control lines 334 may be, for example, the branch instruction provided by the processor 150, a signal derived from the branch instruction, or another control signal that selects the register 342 to provide the NOP instruction 344 based on a determination that the instruction requested by the processor 150 will not be executed. In general, operations of the memory manager 160, such as the operations of the read request processing path 300, may be controlled by a control circuit 350.

It is noted that, in accordance with the various embodiments, the memory manager 160 may be a memory controller and may be a bridge that has various other read and write paths for purposes of routing data between the various memories of the MCU 24 and the system bus 130.

In accordance with some exemplary embodiments, the control circuit 350 further bases the determination of whether to provide the NOP instruction 344 to the system bus 130 on the type of memory that is being accessed by the processor 150. In this regard, in accordance with some exemplary embodiments, requests for instructions may target a variety of memories of the MCU 24, such as the volatile memory 164 and the non-volatile memory 168. In accordance with some exemplary embodiments, the non-volatile memory-accesses typically are slower. As such, the control circuit 350 causes the memory manager 160 to select the NOP instruction 344 when the processor 150 requests instruction from the non-volatile memory 168, which will not be executed; and the control circuit 350 causes the memory manager 160 to retrieve the requested instruction when the request targets the volatile memory 164, even if the request is for an instruction that will not be executed.

Figure 6:
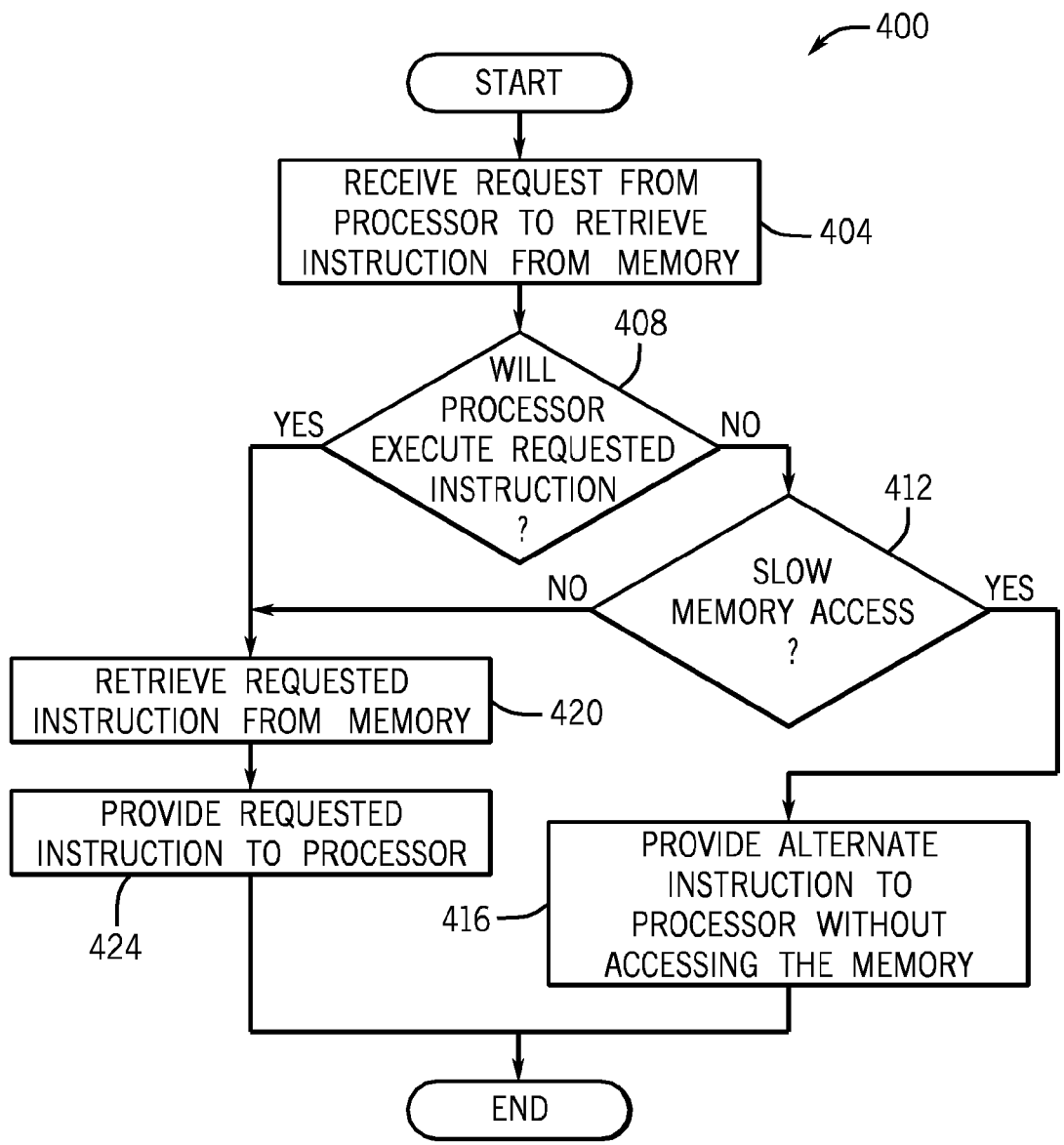

To summarize, the memory manager 160 may perform a technique 400 that is depicted in FIG. 6 in accordance with some exemplary embodiments. Pursuant to the technique 400, the memory manager 160 receives (block 404) a request from the processor 150 to retrieve an instruction from memory. The memory manager 160 determines (diamond 408) whether the processor 150 will execute the requested instruction. In some exemplary embodiments, as described above, this determination is made by examining a signal that is provided by the processor 150, such as the branch signal. If the processor 150 will not execute the requested instruction, then the memory manager 160 determines (diamond 412) whether the processor request is targeting a relatively slow memory (the non-volatile memory 168 versus the volatile memory 164, for example). If so, the memory manager 160 provides an alternate instruction to the processor 150 without accessing the targeted memory, pursuant to block 416.

Otherwise, if either the processor 150 will execute the requested instruction (as determined in diamond 408) or an unused instruction from a relatively faster memory is being targeted (as determined in diamond 412), then the memory manager 160 retrieves the requested instruction from memory, pursuant to block 420, and provides the retrieved data to the system bus 130a and thus, to the processor 150, pursuant to block 424.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   in response to a processor executing a fetch stage of a multiple stage instruction, generating a request on a system bus coupled to the processor to retrieve a first instruction from a memory for a staged execution pipeline;
   receiving the request from the system bus;
   based on a determination of whether the processor will execute the first instruction, selectively performing one of the following:
      retrieving the first instruction from the memory and using the system bus to provide the retrieved first instruction to the processor in response to the request; and
      bypassing retrieving the first instruction from the memory and using the system bus to provide a second instruction other than the first instruction to the processor in response to the request; and
   selectively retrieving the first instruction from the memory based on a memory type associated with the memory.

2. The method of claim 1, wherein the second instruction comprises a no operation instruction.

3. The method of claim 1, further comprising determining whether the processor will execute the first instruction based on a signal provided by the processor.

4. The method of claim 3, wherein the act of determining further comprises determining whether the processor will execute the first instruction based on whether the signal indicates the processor has executed a branch instruction.

5. An apparatus comprising:
   a system bus;
   a processor to provide a request to retrieve a first instruction from a memory for a staged execution pipeline in which the processor concurrently processes fetch, decode and execution stages associated with a plurality of instructions that include the first instruction; and
   a controller, wherein the controller and the processor are separate agents on the system bus, the processor communicates the request to the controller using the system bus, and the controller selectively:
retrieves the first instruction from the memory and uses the system bus to provide the retrieved first instruction to the processor in response to the request; or
bypasses retrieving the first instruction from the memory and uses the system bus to provide a second instruction other than the first instruction to the processor in response to the request,
wherein the controller is further adapted to selectively retrieve the first instruction from the memory based on a memory type associated with the memory.

6. The apparatus of claim 5, wherein the controller comprises a memory manager.

7. The apparatus of claim 5, wherein the processor is adapted to provide a signal indicative of a previously fetched instruction currently being executed by the processor, and the controller is adapted to determine whether the processor will execute the first instruction based on the signal.

8. The apparatus of claim 5, wherein the processor is adapted to provide a signal indicative of whether a previously fetched instruction currently being executed by the processor comprises a branch instruction, and the controller is adapted to determine whether the processor will execute the first instruction based on the signal.

* * * * *